United States Patent [19]

Silbernagel et al.

[11] 4,272,400

[45] Jun. 9, 1981

[54] REGENERATION OF SPENT HYDRODESULFURIZATION CATALYSTS EMPLOYING PRESULFIDING TREATMENT AND HETEROPOLY ACIDS

[75] Inventors: Bernard G. Silbernagel, Scotch Plains; Raam R. Mohan, Berkley Heights; Gopal H. Singhal, Westfield, all of N.J.

[73] Assignee: Exxon Research & Engineering Co., Florham Park, N.J.

[21] Appl. No.: 59,070

[22] Filed: Jul. 19, 1979

Related U.S. Application Data

[63] Continuation of Ser. No. 938,798, Sep. 1, 1978, abandoned.

[51] Int. Cl.$^3$ .................. B01J 23/94; B01J 23/92; B01J 21/20; C10G 23/02
[52] U.S. Cl. .................. 252/413; 208/216 R; 252/411 R; 252/412; 252/414; 423/68; 423/150
[58] Field of Search .................. 252/411 S, 412, 413, 252/414, 416; 208/216 R, 216 PP; 423/68, 150

[56] References Cited

U.S. PATENT DOCUMENTS

| | | | |
|---|---|---|---|
| 2,547,380 | 4/1951 | Fleck | 252/465 |
| 3,259,588 | 7/1966 | Harvey et al. | 252/412 |
| 3,403,111 | 9/1968 | Colgan et al. | 208/216 |
| 3,562,150 | 2/1971 | Hamilton et al. | 252/412 |
| 3,635,838 | 1/1972 | Gatsis | 252/413 |
| 3,791,989 | 2/1974 | Mitchell et al. | 252/413 |
| 4,066,574 | 1/1978 | Tamm | 208/216 R |
| 4,083,771 | 4/1978 | O'Hara | 208/216 R |

FOREIGN PATENT DOCUMENTS 644239 10/1950 United Kingdom .................. 252/413

Primary Examiner—P. E. Konopka
Attorney, Agent, or Firm—D. W. Collins; Edward M. Corcoran

[57] ABSTRACT

The removal of metals, especially vanadium, from spent hydrofining catalyst is accomplished by a two-step process. Treatment with a gaseous sulfur-containing reagent brings the metals to the surface of the catalyst and converts them to sulfides, which are then efficiently removed by contact with a heteropoly acid such as molybdophosphoric acid. Treatment of deactivated hydrodesulfurization catalysts such as Co-Mo supported on alumina by this process results in substantially complete regeneration of catalytic activity.

25 Claims, No Drawings

REGENERATION OF SPENT HYDRODESULFURIZATION CATALYSTS EMPLOYING PRESULFIDING TREATMENT AND HETEROPOLY ACIDS

This is a continuation, of application Ser. No. 938,798, filed Sept. 1, 1978, now abandoned.

BACKGROUND OF THE INVENTION

1. Field of the Invention

The present invention is related to regeneration of spent catalysts used in hydrofining operations, and, more particularly, to the regeneration of spent catalysts employed in hydrodesulfurization and hydrodenitrogenation by treatment with a gaseous sulfur-containing reagent followed by extraction with a heteropoly acid.

2. Description of the Prior Art

As is well-known, hydrodesulfurization of, e.g., petroleum fractions, is carried out employing an alumina catalyst support impregnated with Group VIB and VIII metals such as molybdenum and cobalt. While such catalysts are extremely useful in reducing sulfur content, the effectiveness of these catalysts is diminished during the course of processing as a result of two problems. First, carbon residues (coke) deposit on the surface of the catalyst, thereby reducing the effective surface area and pore size for catalytic activity. Second, heavy metals in the feedstock, such as nickel and, more importantly, vanadium, tend to poison the catalyst, again resulting in reduced catalytic activity. During the course of processing, the temperature is generally increased at a predetermined rate in order to compensate for the coking and poisoning effects. However, as the temperature is increased, a greater percentage of the feedstock is cracked, thereby resulting in a decrease of desirable product. Further, the increase in processing temperature results in an increase in the deposition rate of carbon residues.

Regeneration of spent catalysts has been the subject of much investigation, and, consequently, a number of approaches for regenerating hydrodesulfurization catalysts have been developed. In particular, acidic media, such as mineral acids, anhydrous HF, oxalic acid and other carboxylic acids and acidified amine solutions, and oxidizing media, such as hydrogen peroxide, have been employed. However, such methods either (1) result in removal of unacceptable amounts of catalytically active metals, e.g., cobalt and molybdenum, as well as some solubilization of the support material, e.g., alumina, or (2) do not regenerate a sufficiently high degree of catalytic activity, so the catalytic activity of the regenerated catalyst is considerably inferior to that of fresh catalyst.

A sulfurous atmosphere at a pressure of at least 0.10 atmospheres and at a temperature of between 400° and 825° C. has also been employed to regenerate the spent metal catalyst; see U.S. Pat. No. 4,014,815, issued Mar. 29, 1977. The process is employed for a time sufficient for the selective formation of sulfides of carbon and vanadium, which sulfides are characterized by having a high volatility and solubility in the sulfurous atmosphere and are selectively removed from the catalyst at the temperature of the process. While the disclosed process is useful in regeneration of spent catalysts, it requires highly corrosive conditions and formation and very specific volatile sulfide species. The temperatures required for vanadium removal at acceptable rates may damage the catalyst support.

SUMMARY OF THE INVENTION

In accordance with the invention, spent catalyst which has been used in hydrofining of hydrocarbon feedstock is regenerated by first contacting the spent catalyst with a gaseous sulfur-containing reagent having a partial pressure of sulfur of at least about 0.01 atmospheres at a temperature of up to about 650° C. Following this treatment, the sulfided, spent catalyst is contacted with a heteropoly acid. The disclosed process results in the extraction of about 70 to 100% vanadium, greater than about 90% nickel and about 50% cobalt, with essentially no loss of molybdenum and aluminum and with preservation of the structural integrity of the support. Extraction of metals is accompanied by partial removal of sulfur which has accumulated on the catalyst support during hydrofining and by substantial increase in pore volume and surface area.

For removal of certain vanadium species which are largely unaffected by other processes, hydrogen peroxide may be combined with the heteropoly acid. This permits ready extraction of higher oxidation states of vanadium.

Additional processing by doping the demetallized catalyst with cobalt followed by calcination markedly promotes carbon decoking, further sulfur removal and additional increase in surface area and pore volume. Hydrofining activity and product selectivity of the regenerated spent catalyst is substantially the same as that of fresh catalyst.

DETAILED DESCRIPTION OF THE INVENTION

Regeneration of substantially complete catalytic activity in spent hydrodesulfurization catalysts is accomplished by treating spent catalysts with a gaseous sulfur-containing reagent followed by contact with a heteropoly acid.

The hydrodesulfurization catalysts which may be treated in accordance with the invention include those supported catalysts having Group VIB and VIII metals, including nickel, cobalt, tungsten and molybdenum and combinations of these. The metals may be in elemental, oxide or sulfide form or any combination thereof. The support may be any refractory oxide or other inert support, including alumina.

The spent catalyst may be pre-cleaned with an organic solvent to remove contaminating surface oils prior to treatment. The organic solvent can vary over a wide range of hydrocarbons comprising aliphatics, aromatics, cycloparaffins or mixtures of these, preferably boiling below about 250° C. Examples of suitable organic solvents include decane, benzene, toluene, xylene, cyclohexane and tetralin. Cracked naphtha can also be used. The object of the solvent extraction process is to render the surface and the bulk of the catalyst more accessible to the sulfur vapor and thereby effect efficient removal of the contaminating metals, e.g., vanadium and nickel.

The spent catalyst is first sulfided with a sulfur-containing reagent having a partial pressure of sulfur of at least about 0.01 atmospheres and preferably at least about 0.1 to 1 atmospheres at the processing temperature given below. An example of a suitable sulfur-containing reagent is $H_2S$, either pure or diluted to no less than about 15% by an active gas such as hydrogen or an inert gas such as nitrogen or argon.

The temperature of the sulfiding process may be carried out at any temperature up to about 650° C. and preferably about 300° to 500° C. Most preferably, the temperature should be at least about 425° C. for sesquisulfide ($V_2S_3$) formation. The sesquisulfide forms more rapidly than $VS_4$, which is formed at lower temperatures.

The time of the presulfiding process preferably ranges from about 1 to 4 hours, with shorter times being associated with higher temperatures. For example, presulfiding spent HDS catalyst in $H_2S$ (neat) for 4 hours at 500° C. results in substantially complete conversion of vanadium species such as $VO^{2+}$, $VS_4$, $VO_xSO_y$ to vanadium sulfide.

The sulfided spent catalyst is then contacted with a heteropoly acid under mild conditions of pH, temperature and agitation, employing any of the contacting processes usually used in petroleum processing, such as in a stationary phase or mildly agitated condition or in a plug flow reactor or any continuous moving concurrent or countercurrent liquid-solid bed reactor. The temperature of the process ranges between ambient to about 80° C. and preferably about 30° to 60° C. to maintain the stability and concentration of the heteropoly anion.

An aqueous solution of the heteropoly acid is preferably employed. The concentration of heteropoly acid in aqueous solution ranges from about 0.1 to 25 wt. % and preferably about 0.2 to 6 wt. %. The concentration of the heteropoly acid is chosen on the basis of the loading of the toxic metal contaminants, with higher concentrations being associated with higher concentrations of contaminants.

The pH of the solution ranges from about 1 to 3, and preferably about 1.5 to 2.5, to maintain the stability of the heteropoly acid in solution.

The spent catalyst is contacted with the heteropoly acid for about 4 to 200 hours and preferably about 5 to 50 hours, depending upon the amount of metals to be removed. The longer times are associated with higher concentrations of contaminants. In general, the reaction is substantially complete in about 10 to 24 hours, depending on the catalyst particulate size and the vanadium species present. The heteropoly acid may be optionally replaced with fresh solution at suitable intervals, such as about 10 hours, to accelerate removal of the contaminating metals.

An aqueous solution of a heteropoly acid with hydrogen peroxide is most preferably employed. The concentration of the hydrogen peroxide in the solution ranges from about 1 to 50 wt. % and preferably 3 to 15 wt. % and more preferably about 15 wt. %, based on the amount of heteropoly acid. Conveniently, the volume ratio of heteropoly acid to hydrogen peroxide is about 100:1, employing prediluted hydrogen peroxide to form a solution having the final concentration given above.

The use of hydrogen peroxide in conjunction with heteropoly acid is particularly efficacious in removing certain vanadium species which are largely unaffected by other processes. For example, the combination of molybdophosphoric acid and hydrogen peroxide results in the oxidation of compounds containing vanadyl species ($VO^{2+}$) by a factor of three times as compared with molybdophosphoric acid treatment alone. The presence of at least about 1 wt. % $H_2O_2$ is necessary to achieve the effect, while greater than about 50 wt. % $H_2O_2$ provides little additional benefit. Without subscribing to any particular theory, it appears that the hydrogen peroxide provides several benefits. First, hydrogen peroxide apparently helps maintain the heteropoly acid in the highest oxidation state. Otherwise, vanadium species, in being oxidized from lower to higher states, would reduce the heteropoly acid, thus adversely affecting its extracting capabilities. Second, hydrogen peroxide apparently assists in oxidizing $V^{4+}$ to $V^{5+}$, $VO^{2+}$ to $V_2O_5$ and $V_2S_3$ to $VOSO_4$, all of which higher oxidation species are more soluble and hence more extractable by the heteropoly acid.

Use of the heteropoly acid/hydrogen peroxide solution also results in a significant increase in both rate and extent of carbon radical generation. While a three-fold increase in carbon radical density accompanies treatment with a heteropoly acid alone such as molybdophosphoric acid, addition of hydrogen peroxide leads to a higher carbon radical level at a faster rate. The increased carbon radical level apparently indicates breaking of the carbon "crust" on the catalyst surface, again facilitating extraction of contaminating metals.

Heteropoly acids useful in the practice of the invention have the general formula $H_x(YM_{12}O_{40})$, where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent (P, As) and x is 4 when Y is tetravalent (Si, Ti, Ge, Zr, Ce, Th). Up to one-half of M may be replaced by at least one element selected from the group consisting of nickel, cobalt and vanadium. During recrystallization of a heteropoly acid, a hydrated species of the acid is usually obtained, as is well-known. The number of water molecules depends on the particular process of recrystallization of the heteropoly acid and, while typically ranging from about 5 to 50, is not critical. Examples of heteropoly acids useful in the practice of the invention include molybdophosphoric acid, $H_3(PMo_{12}O_{40})$, molybdosilicic acid, $H_4(SiMo_{12}O_{40})$, tungstosilicic acid, $H_4(SiW_{12}O_{40})$, and tungstophosphoric acid, $H_3(PW_{12}O_{40})$.

For Co-Mo/$Al_2O_3$ catalysts, a molybdenum-containing heteropoly acid is preferred, since it has been found that heteropoly acid treatment incorporates molybdenum in the $Al_2O_3$ support in a dispersed manner without phosporus overloading. The addition of hydrogen peroxide to the heteropoly acid is found not to alter this result. An example of a heteropoly acid particularly useful in the practice of the invention is molybdophosphoric acid (MPA) having the general formula $H_3(PMo_{12}O_{40}) \cdot nH_2O$, for example, $H_3(PMo_{12}O_{40}) \cdot 36H_2O$.

The method disclosed above results in the extraction of about 70 to 100% vanadium, greater than about 90% nickel and about 50% cobalt, together with substantial increase in both surface area and pore volume of the catalyst. The alumina-based support remains essentially unchanged. This process also results in molybdenum loading on the support in a well-dispersed manner without aggregation or cluster formation. Surprisingly, excess phosphorus loading is avoided by the process of the invention. Finally, the extraction of vanadium, nickel and cobalt results in a substantial reduction in sulfur build-up in the catalyst. While not subscribing to any particular theory, it appears that the reduction is due to removal of sulfur in the form of oxysulfides, oxysulfites or oxysulfates of the metals.

As described above, the process results in substantial removal of metals which tend to poison the catalyst, with consequent removal of other contaminants such as sulfur and concommitant regeneration of catalytic activity. However, it has also been found that one-time (1×) impregnation of the catalyst with a cobalt salt following treatment with the heteropoly acid, followed by calcination at modified temperatures of about 450° C. or less in air, results in the substantial removal of carbon as well as further removal of sulfur, together with a further increase in pore volume and surface area of the catalyst, and accordingly is preferred.

Cobalt impregnation may be accomplished using water soluble cobalt salts, preferably sulfur-free water soluble cobalt salts, such as cobalt nitrate and cobalt acetate. Impregnation may be done by the well-known techniques of incipient wetness, adsorption from solution or evaporation of the salt onto the catalyst. Because of ease of operation, incipient wetness technique is preferred.

The calcination is carried out for about 2 to 15 hours, preferably about 3 to 6 hours, in an oxidizing atmosphere, such as air, in order to maintain support integrity and to facilitate coke removal. The cobalt salt is oxidized with cobalt oxide and carbon is oxidized to gaseous oxides of carbon. Moderate calcination temperatures reduce the risk of formation of localized hot spots, which would otherwise result in fracture of the catalyst support. However, higher temperatures may be employed by carefully employing the oxygen content of the atmosphere, as is well known in the art. A second (2×) cobalt impregnation followed by a second calcination under the conditions given above result in essentially complete removal of carbon and sulfur from the catalyst, and accordingly is most preferred.

Analogous nickel salts may alternatively be employed to impregnate nickel in HDS catalysts such as $Ni-Mo/Al_2O_3$.

Metals such as nickel, cobalt, vanadium and the like solubilized by the heteropoly acid or heteropoly acid/hydrogen peroxide solution can be recovered by conventional solvent extraction, ion exchange or chelation technology. Metals so recovered can be used in the impregnation process (e.g., Co and $Co-Mo/Al_2O_3$ catalysts) or for the manufacture of fresh catalysts. In place of cobalt salts, nickel salts can also be used to aid in coke burning and to provide catalyst containing primarily $Ni-Mo/Al_2O_3$, which are suitable for hydrodenitrogenation reaction in addition to possessing HDS activity.

EXAMPLES

EXAMPLE 1

Conversion of the Surface Vanadium Species to Vanadium Sulfide

Samples of small pore $Co-Mo/Al_2O_3$ spent hydrotreating catalyst from the Amuay refiner used for hydrodesulfurization in Exxon GO-FINING process were subjected to treatments of varying temperatures and duration with substantially pure $H_2S$ gas at 1 atm. The results are tabulated in Table I below.

TABLE I

|  | Temperature | Time | % $V_2S_3$ (Approx.) |
|---|---|---|---|
| Spent catalyst | — | — | 0 |

TABLE I-continued

|  | Temperature | Time | % $V_2S_3$ (Approx.) |
|---|---|---|---|
| $H_2S$ Treatments: | 400° C. | 4 hr. | 50 |
|  | 500° C. | 4 hr. | 80 |
|  | 500° C. | 1 hr. | 40 |
|  | 600° C. | 1 hr. | 65 |

The results show that a substantial portion of the surface vanadium species is converted to $V_2S_3$. This species is readily extractable with a heteropoly acid such as dodecamolybdophosphoric acid (MPA).

EXAMPLE 2

Effect of Presulfiding on Vanadium Extraction

Solvent-extracted spent $Co-Mo/Al_2O_3$ was presulfided with a stream of 100% $H_2S$ (1 atm) at a flow rate of 10 liter/hr at 500° C. for 4 hrs. The temperature was slowly raised from 30° to 90° C. in 0.5 hr, from 90° to 500° C. in 1 hr. and held at 500° C. for 4 hrs. After presulfiding, the catalyst was cooled to room temperature with a stream of $O_2$-free, dry nitrogen. The presulfided, spent caytalyst was stored under nitrogen atmosphere until further use.

The vanadium extraction with a heteropoly acid, molybdophosphoric acid (MPA), from a presulfided 1/16 inch extrudate was carried out in a continuous plug flow reactor at a flow rate of 1 ml/min and at a temperature of 60° C. Aqueous solutions of MPA alone and MPA+15 wt. % $H_2O_2$ 100:1 v/v were employed. The amount of MPA was 0.4 wt. %; the pH was 2.3. Samples were collected at suitable intervals and vanadium concentration was determined with atomic absorption spectrophotometry. The data on the percent vanadium extracted at various intervals are summarized in Table II, below.

TABLE II

| PERCENT OF VANADIUM EXTRACTED | | | | | | | |
|---|---|---|---|---|---|---|---|
| | Extraction Time, hrs. | | | | | | |
| Treatment | 5 | 10 | 15 | 20 | 30 | 40 | 50 |
| MPA | 9 | 18 | 26 | 33 | 44 | 54 | 62 |
| Presulfided+MPA | 20 | 28 | 35 | 43 | 56 | 68 | 78 |
| MPA + $H_2O_2$ | 42 | 53 | 60 | 64 | 72 | 77 | 83 |
| Presulfided+MPA + $H_2O_2$ | 45 | 54 | 62 | 70 | 82 | 90 | 97 |

From Table II, it is clear that incorporation of the presulfiding step is highly beneficial to the vanadium extraction. Combining presulfiding with the heteropoly acid/hydrogen peroxide extraction results in almost complete removal of vanadium.

EXAMPLE 3

Effect of Presulfiding Temperature on Vanadium Extraction

Two samples of solvent-extracted, 1/16 inch extrudates of spent $Co-Mo/Al_2O_3$ catalyst were presulfided at 400° C. and at 500° C. for 4 hrs in a 100% $H_2S$ stream. The extraction with heteropoly acid (MPA) alone and supplemented with 15 wt. % $H_2O_2$ (as in Example 2) was carried out in a continous plug flow reactor at 60° C. with a flow rate of 1 ml/min. Samples were collected at suitable intervals and analyzed for vanadium with atomic absorption spectrophotometry. The data on the percent vanadium extracted are summarized in Table III below.

TABLE III
PERCENT VANADIUM EXTRACTED

| Treatment | | Extraction Time, hrs. | | | | |
|---|---|---|---|---|---|---|
| Presulfide | Extraction | 2 | 4 | 5 | 7 | 10 |
| — | MPA | — | — | 9 | — | 18 |
| 400° C., 4 hrs | MPA | 4 | 11 | — | 16 | 21 |
| — | MPA + H$_2$O$_2$ | — | — | 42 | — | 53 |
| 400° C., 4 hrs | MPA + H$_2$O$_2$ | 12 | 21 | — | 40 | 48 |
| 500° C., 4 hrs | MPA + H$_2$O$_2$ | 12 | 23 | — | 40 | 53 |

| Treatment | | Extraction Time, hrs. | | | | |
|---|---|---|---|---|---|---|
| Presulfide | Extraction | 15 | 18 | 20 | 26 | 30 |
| — | MPA | 26 | — | 33 | — | 44 |
| 400° C., 4 hrs | MPA | 30 | 33 | — | 42 | — |
| — | MPA + H$_2$O$_2$ | 60 | — | 64 | — | 72 |
| 400° C., 4 hrs | MPA + H$_2$O$_2$ | 58 | 63 | — | 76 | — |
| 500° C., 4 hrs | MPA + H$_2$O$_2$ | 72 | 80 | — | 92 | — |

Again it is clear that presulfiding, particularly at higher temperatures, increases both the rate and extent of vanadium removal.

EXAMPLE 4
Effect of Catalyst Particulate Size on Vanadium Extraction

The experiment given in Example 3 was repeated, except that the catalyst was crushed to give 20 to 40 mesh size particles. Presulfiding was carried out at 500° C. for 4 hrs. Extraction was with MPA and 15 wt. % H$_2$O$_2$ 100:1 v/v. The data are summarized in Table IV below.

TABLE IV
PERCENT VANADIUM EXTRACTED

| Treatment | Extraction Time, hrs. | | | | | | | |
|---|---|---|---|---|---|---|---|---|
|  | 3 | 5 | 10 | 15 | 20 | 25 | 30 | 35 | 40 |
| Presulfided + MPA + H$_2$O$_2$ | 20 | 27 | 45 | 57 | 66 | 74 | 80 | 90 | 95 |

EXAMPLE 5
Effect of Presulfiding Temperature on Vanadium Extraction from Crushed Catalyst The experiment given in Example 4 was repeated, employing presulfiding temperatures of 500° C. for 1 hr and 600° C. for 1 hr. The data on the percent vanadium extracted are summarized in Table V, below.

TABLE V
PERCENT VANADIUM EXTRACTED

| Presulfide Treatment | Extraction Time, hrs. | | | | | | |
|---|---|---|---|---|---|---|---|
|  | 2 | 4 | 5 | 8 | 10 | 12 | 16 |
| 500° C., 1 hr. | 21 | 39 | 54 | 75 | 87 | 90 | 95 |
| 600° C., 1 hr. | 29 | 54 | 65 | 77 | 87 | 92 | 97 |

These data suggest that presulfiding treatments of shorter duration are adequate to convert to an extractable sulfide.

EXAMPLE 6
X-Ray Crystallite Size Measurement

Samples of small pore 1/16 inch extrudate and 20 to 40 mesh size particles of Co-Mo/Al$_2$O$_3$ spent hydrotreating catalyst used for hydrodesulfurization were subjected to treatments of varying temperatures and duration with a 100% H$_2$S gas (1 atm) at a velocity of 10 liters/hr. The catalyst was cooled to room temperature under a stream of inert gas such as oxygen-free nitrogen or argon. The Al$_2$O$_3$ crystallite size was determined by X-ray diffraction. The results are summarized in Table VI, below.

TABLE VI

|  | Al$_2$O$_3$ Crystallite Size, Å |
|---|---|
| Spent Catalyst, solvent extracted | 41 |
| Presulfided at 400° C.-4 hrs (pellet) | 44 |
| Presulfided at 500° C.-4 hrs (pellet) | 46 |
| Presulfided at 500° C.-1 hr (20-40 mesh) | 43 |
| Presulfided at 600° C.-1 hr (20-40 mesh) | 43 |

From Table VI, it is clear that presulfiding the spent catalyst, whether 1/16 inch pellets or 20 to 40 mesh size particles, at the conditions listed does not substantially alter the Al$_2$O$_3$ crystallite size. This indicates that the structural integrity of the support is essentially preserved.

What is claimed is:

1. An improved process for regenerating spent hydrofining catalysts which comprises contacting spent catalyst with a gaseous sulfur-containing reagent having a partial pressure of sulfur of at least about 0.01 atmospheres at a temperature of up to about 650° C., followed by contacting the catalyst with an aqueous solution of a heteropolyacid, impregnating with a water soluble cobalt or nickel salt and calcining at a maximum temperature of about 450° C.

2. The process of claim 1 in which spent catalyst is pre-cleaned with an organic solvent.

3. The process of claim 1 in which the heteropoly acid contains about 1 to 50 wt. % hydrogen peroxide.

4. The process of claim 3 in which the hydrogen peroxide concentration ranges from about 3 to 15 wt. %.

5. The process of claim 4 in which the concentration of hydrogen peroxide is about 15 wt. %.

6. The process of claim 1 in which the catalyst is impregnated with a water soluble cobalt salt.

7. The process of claim 1 in which the impregnation and calcination are repeated at least once.

8. The process of claim 1 in which the hydrofining catalyst comprises a cobalt-molybdenum loaded alumina support.

9. The process of claim 1 in which the partial pressure of sulfur of the sulfur-containing reagent is about 0.1 to 1 atmospheres.

10. The process of claim 9 in which the gaseous sulfur-containing species is H$_2$S, present in an amount of at least about 15%.

11. The process of claim 1 in which the catalyst is contacted with the gaseous sulfur-containing reagent at a temperature of about 300° to 500° C.

12. The process of claim 11 in which the temperature is at least about 425° C.

13. The process of claim 1 in which the spent catalyst is contacted with the gaseous sulfur-containing reagent for a period of time of about 1 to 4 hours.

14. The process of claim 1 in which the heteropoly acid is represented by the general formula H$_x$(YM$_{12}$O$_{40}$), where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent and 4 and when Y is tetravalent.

15. The process of claim 14 in which Y is at least one of phosphorus and silicon and M is at least one of molybdenum and tungsten.

16. The process of claim 15 in which Y is phosphorus and M is molybdenum.

17. The process of claim 14 in which up to one-half of M is replaced by at least one element selected from the group consisting of nickel, cobalt and vanadium.

18. The process of claim 1 in which the spent catalyst is contacted by the heteropoly acid at a temperature between ambient and about 80° C.

19. The process of claim 18 in which the temperature ranges from about 30° to 60° C.

20. The process of claim 1 in which the heteropoly acid is dissolved in an aqueous medium in a concentration ranging from about 0.1 to 25 wt. %.

21. The process of claim 20 in which the concentration ranges from about 0.2 to 6 wt. %.

22. The process of claim 20 in which the aqueous solution has a pH ranging from about 1 to 3.

23. The process of claim 22 in which the pH ranges from about 1.5 to 2.5.

24. The process of claim 1 in which the spent catalyst is contacted with heteropoly acid for a period of time of between about 4 and 200 hours.

25. The process of claim 24 in which the period of contact ranges from about 10 to 50 hours.

* * * * *